(12) United States Patent
Trombetta et al.

(10) Patent No.: US 10,561,932 B2
(45) Date of Patent: *Feb. 18, 2020

(54) POSITIONING A CAMERA VIDEO OVERLAY ON GAMEPLAY VIDEO

(71) Applicant: Microsoft Technology Licensing, LLC, Redmond, WA (US)

(72) Inventors: Steven P. Trombetta, Seattle, WA (US); Travis J. Muhlestein, Redmond, WA (US); Joanna Mason, Redmond, WA (US); Saswata Mandal, Bellevue, WA (US); Corey E. Rogers, Redmond, WA (US); Ryan Y. Kim, Bellevue, WA (US); Sudhakar V. Prabhu, Redmond, WA (US); Jesse D. Kaplan, Sammamish, WA (US); Adam M. Smith, Sammamish, WA (US)

(73) Assignee: Microsoft Technology Licensing LLC, Redmond, WA (US)

(*) Notice: Subject to any disclaimer, the term of this patent is extended or adjusted under 35 U.S.C. 154(b) by 112 days.

This patent is subject to a terminal disclaimer.

(21) Appl. No.: 15/712,959

(22) Filed: Sep. 22, 2017

(65) Prior Publication Data

US 2018/0093174 A1    Apr. 5, 2018

Related U.S. Application Data

(63) Continuation of application No. 14/465,701, filed on Aug. 21, 2014, now Pat. No. 9,795,871.

(Continued)

(51) Int. Cl.
A63F 13/00    (2014.01)

(52) U.S. Cl.
CPC .................... *A63F 13/00* (2013.01)

(58) Field of Classification Search
CPC .......................................... A63F 13/00
See application file for complete search history.

(56) References Cited

U.S. PATENT DOCUMENTS

| 8,128,503 B1* | 3/2012 | Haot | ........... H04N 21/234 |
| | | | 463/42 |
| 8,595,761 B2 | 11/2013 | Amsterdam et al. | |

(Continued)

FOREIGN PATENT DOCUMENTS

WO    WO 2013/033259    3/2013

OTHER PUBLICATIONS

Electronista, "Twitch Offers SDK to Add Game Broadcasting to Mobile Games," 4 pp., downloaded from the World Wide Web on Aug. 5, 2014 (document marked Mar. 5, 2014).
Lowensohn, "Twitch for Xbox One Now Lets You Broadcast Your Games," 4 pp., downloaded from the World Wide Web on Apr. 11, 2014 (document marked Mar. 10, 2014).

(Continued)

*Primary Examiner* — Corbett B Coburn
(74) *Attorney, Agent, or Firm* — Klarquist Sparkman, LLP

(57) ABSTRACT

A gaming console composites a camera video overlay on gameplay video for broadcasting such that the gameplay area that is rendered by the gaming console is not obscured, even when the camera video overlay is composited on the gameplay video for broadcasting. The gaming console or a companion device of the gaming console can also allow a user to specify placement of the camera video overlay on the gameplay video for broadcasting, permitting the user to choose the portion of the gameplay video for broadcasting that is obscured by the camera video overlay.

20 Claims, 3 Drawing Sheets

Related U.S. Application Data

(60) Provisional application No. 61/979,888, filed on Apr. 15, 2014.

(56) References Cited

U.S. PATENT DOCUMENTS

| | | | |
|---|---|---|---|
| 9,573,062 B1* | 2/2017 | Long | H04N 13/117 |
| 9,795,871 B2* | 10/2017 | Trombetta | A63F 13/00 |
| 2004/0119815 A1* | 6/2004 | Soloff | H04N 5/445 348/39 |
| 2008/0178232 A1* | 7/2008 | Velusamy | H04N 5/23203 725/88 |
| 2012/0236158 A1* | 9/2012 | Oleksy | H04N 5/232 348/207.1 |
| 2012/0271711 A1 | 10/2012 | Moshiri et al. | |
| 2012/0299920 A1* | 11/2012 | Coombe | G06T 19/00 345/423 |
| 2013/0113802 A1* | 5/2013 | Weersink | G06T 15/20 345/427 |
| 2014/0094304 A1* | 4/2014 | Harris | A63F 13/00 463/31 |
| 2015/0062125 A1* | 3/2015 | Aguilera Perez | G06T 19/003 345/427 |
| 2015/0154452 A1* | 6/2015 | Bentley | G06K 9/00711 386/201 |

OTHER PUBLICATIONS

Maestas, "Broadcasting, Chat, and More Coming to Xbox One," The Official Twitch Blog, downloaded from the World Wide Web, 8 pp. (Feb. 2014).

Maestas, "Broadcasting, Chat, and More Coming to Xbox One," downloaded from the World Wide Web, 8 pp. (Feb. 25, 2014).

McCormick, "Xbox One Will Get Twitch Live Video Game Streaming on Mar. 11," downloaded from the World Wide Web, 5 pp. (Feb. 2014).

Microsoft Corporation, "Introducing a Truly Next-Gen Twitch Experience on Xbox One," downloaded from the World Wide Web, 4 pp. (Feb. 2014).

Mirillis Ltd., "Action! Live Streaming," 3 pp., downloaded from the World Wide Web on Aug. 5, 2014 (document marked 2014).

Mirillis Ltd., "Mirillis Action! Tutorials: Webcam Recording Tutorials," 4 pp., downloaded from the World Wide Web on Aug. 21, 2014 (document marked Jun. 17, 2013).

Sony Computer Entertainment America LLC, "Broadcast PS4 Gameplay," 2 pp., downloaded from the World Wide Web on Apr. 11, 2014 (document marked Apr. 1, 2014).

"Final Office Action Issued in U.S. Appl. No. 14/465,701," dated Mar. 31, 2017, 10 Pages.

"Non-final Office Action Issued in U.S. Appl. No. 14/465,701," dated Oct. 14, 2016, 8 Pages.

* cited by examiner

POSITIONING A CAMERA VIDEO OVERLAY ON GAMEPLAY VIDEO

RELATED APPLICATION INFORMATION

The present application is a continuation of U.S. patent application Ser. No. 14/465,701, filed Aug. 21, 2014, now U.S. Pat. No. 9,795,871, and claims the benefit of U.S. Provisional Patent Application No. 61/979,888, filed Apr. 15, 2014, the disclosure of both applications are hereby incorporated by reference.

BACKGROUND

Video gaming has become a popular spectator activity. Every month, millions of minutes of gameplay video are uploaded to streaming video services, which store the gameplay video and make it available for playback. Some services even offer "live" broadcasting of gameplay video in real time or near real time as the gameplay happens.

In a typical configuration, gameplay is recorded at a gaming console, smartphone or personal computer. A video encoder encodes frames of the gameplay, depicting animation rendered to the display and/or other graphical details. An audio encoder encodes sound effects, voice effects and/or other audio that accompanies the gameplay video. The encoded data is uploaded to a streaming video service, which makes the gameplay video (including associated audio) available for streaming.

In some configurations, the person playing a video game at a gaming console can provide audio commentary to narrate the gameplay as it happens. In some existing approaches, the player can also share a video of himself/herself playing the video game. This allows the player to add gestures, facial expressions, etc. to the gameplay video that is recorded at the gaming console. In these existing approaches, however, the camera video of the player appears at a fixed location in the gameplay video that is recorded at the gaming console. Depending on the game or stage of the game, the camera video overlay of the player may obscure an important part of the gameplay area in the gameplay video that is streamed to viewers. Also, in some existing approaches, the camera video overlay of the player may obscure part of the gameplay area that the player sees, which can be highly disruptive to the player.

SUMMARY

In summary, the detailed description presents ways for a gaming console or companion device associated with the gaming console to allow a user to specify placement (that is, position) of a camera video overlay on gameplay video. This can permit the user to choose the portion of the gameplay video that is obscured by the camera video overlay, which can improve the quality of the gameplay video that is broadcast. The detailed description also presents approaches for a gaming console to composite a camera video overlay on gameplay video. With such approaches, the gameplay area that is rendered by the gaming console locally for a player is not obscured even when a camera video overlay is composited on gameplay video for broadcasting, which improves playability by avoiding disruptions to the player in the gameplay area.

According to one aspect of the innovations described herein, a gaming console or companion device renders for display a configuration menu that shows options for placement of a camera video overlay on gameplay video. For example, the options for the placement of the camera video overlay include four corner locations on the gameplay video. Alternatively, the options for the placement of the camera video overlay include other and/or additional locations on the gameplay video (e.g., middles of sides, free positioning at arbitrary x, y coordinates on the gameplay video). The configuration menu can also show (a) a preview of the camera video overlay as composited on the gameplay video at the specified placement, (b) an option for enabling or disabling input from a video camera for the camera video overlay, (c) an option for enabling or disabling input from a microphone, (d) options for re-sizing the camera video overlay, (e) options for including a chat stream and/or (f) other controls or options.

The gaming console or companion device receives user input specifying the placement of the camera video overlay on the gameplay video. The gaming console or companion device stores an indication of the specified placement (e.g., locally and/or in cloud-based storage). The gaming console can use the indication of the specified placement when later compositing the camera video overlay on the gameplay video for broadcasting.

The specified placement of the camera video overlay on the gameplay video can be used throughout an entire gameplay broadcast. Alternatively, the placement of the camera video overlay on the gameplay video can be changed during broadcasting. For example, during broadcasting, the gaming console or companion device renders the configuration menu again, receives new user input specifying the placement of the camera video overlay on the gameplay video, and stores an indication of the newly specified placement, which is used when compositing the camera video overlay on the gameplay video for broadcasting. In this way, during broadcasting, the user can change which portion of the gameplay video is obscured by the camera video overlay, depending on the stage of the gameplay or some other factor.

According to a second aspect of the innovations described herein, a gaming console receives a frame of gameplay video (e.g., from a screen capture module that captures gameplay rendered for display) and also receives a frame of camera video overlay (e.g., from a video camera that captures natural video). The gaming console can resize (e.g., down-sample) the frame of camera video overlay before compositing, or the frame of camera video overlay can be provided (e.g., by the video camera) at the appropriate resolution.

The gaming console composites the frame of the camera video overlay on the frame of the gameplay video to produce a composited frame. For example, the gaming console composites the frame of camera video overlay at a placement specified by a user, which can be selected as described above. The gaming console provides the composited frame to a video encoder, which produces encoded video data. The gaming console provides the encoded video data to a buffer for transmission. For example, the encoded video data is streamed over a network to a server for storage and/or broadcasting to one or more viewers. Or, the encoded video data is streamed over a network to another gaming console or a viewing device (such as a companion device for the other gaming console or the originating gaming console) for storage and/or playback. The gaming console can repeat this process on a frame-by-frame basis.

When the gameplay is rendered for display at the gaming console, the gameplay can be rendered without compositing the camera video overlay. Thus, the gameplay is not obstructed by the camera video overlay at the gaming console, even when the camera video overlay is composited on the gameplay video that is broadcast.

The foregoing and other objects, features, and advantages of the invention will become more apparent from the following detailed description, which proceeds with reference to the accompanying figures.

DETAILED DESCRIPTION

The detailed description presents ways for a gaming console or companion device associated with the gaming console to allow a user to specify the placement (that is, position) of a camera video overlay on gameplay video. For example, a configuration menu can present options for overlaying the camera video at different corners of the gameplay video for broadcasting, allowing the user to specify which corner of a gameplay video is obscured by the camera video overlay in the gameplay broadcast. The detailed description also presents approaches for a gaming console to composite a camera video overlay on gameplay video. With such approaches, the gameplay area that is rendered by the gaming console locally for a player is not obscured even when a camera video overlay is composited on gameplay video for broadcasting.

Although operations described herein are in places described as being performed by a gaming console, in many cases the operations can be performed by another type of computing device (e.g., smartphone, tablet computer, personal computer).

More generally, various alternatives to the examples described herein are possible. For example, certain techniques described with reference to flowchart diagrams can be altered by changing the ordering of stages shown in the flowcharts, by splitting, repeating or omitting certain stages, etc. The various aspects of the disclosed technology can be used in combination or separately. For example, the approaches to compositing a camera video overlay on gameplay video for broadcasting without obscuring local rendering of gameplay can be used without adjustable positioning of the camera video overlay on the gameplay video for broadcasting. Different embodiments use one or more of the described innovations. Some of the innovations described herein address one or more of the problems noted in the background. Typically, a given technique/tool does not solve all such problems.

I. Example Gaming Consoles

Figure 1:
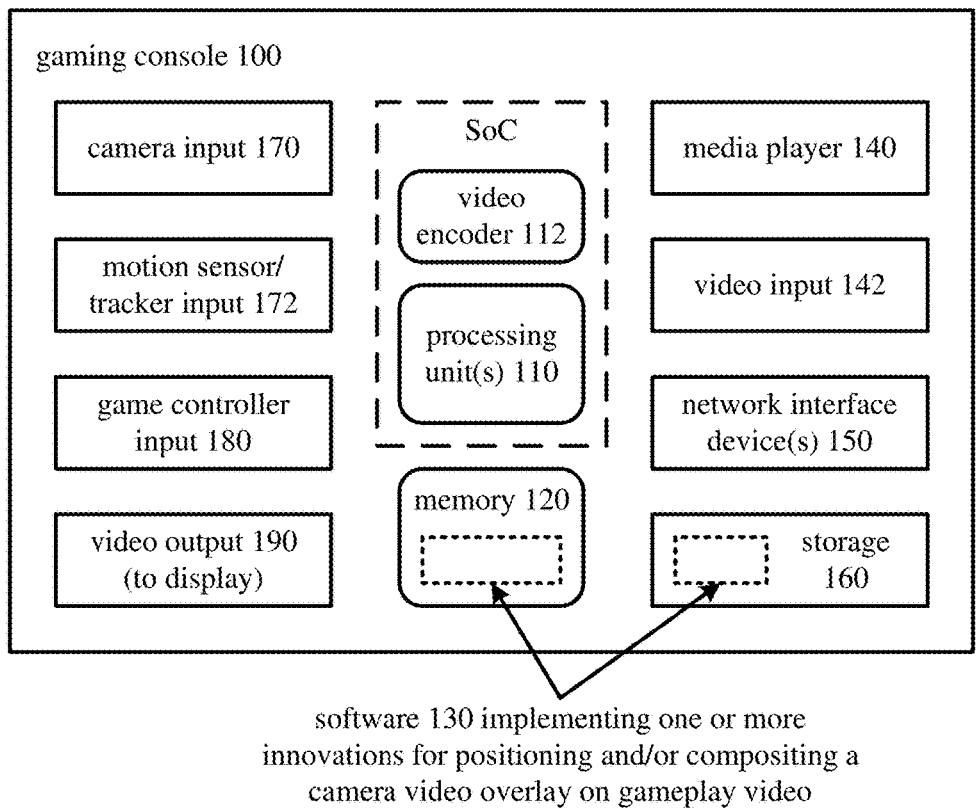
FIG. 1 is a diagram of an example gaming console in which some described embodiments can be implemented.

FIG. 1 illustrates a generalized example of a suitable gaming console (100) in which several of the described innovations may be implemented. The innovations described herein relate to video gaming, which in general involves human interaction with a user interface of a computing system that generates visual feedback on a display device (e.g., with real-time or near real-time interactivity) according to a set of rules. Aside from its use in video gaming, the gaming console (100) is not intended to suggest any limitation as to scope of use or functionality, as the innovations may be implemented in diverse computing systems, including special-purpose computing systems adapted for video gaming or graphics processing.

With reference to FIG. 1, the gaming console (100) includes one or more processing units (110) and memory (120). The processing unit(s) (110) execute computer-executable instructions. A processing unit can be a central processing unit ("CPU"), a processor in an application-specific integrated circuit ("ASIC") or any other type of processor. As shown in FIG. 1, the processing unit(s) (110) can be part of a system-on-a-chip ("SoC"). The memory (120) may be volatile memory (e.g., registers, cache, RAM), non-volatile memory (e.g., ROM, EEPROM, flash memory, etc.), or some combination of the two, accessible by the processing unit(s) (110). The memory (120) stores software (130) implementing one or more innovations for positioning and/or compositing a camera video overlay on gameplay video, in the form of computer-executable instructions.

The gaming console (100) optionally includes a media player (140) and video input (142). The media player (140) can play DVDs, Blu-ray disks, other disk media and/or other formats of media. The video input (142) can accept input video in analog or digital form (e.g., from a cable input, HDMI input or other input).

The gaming console (100) includes one or more network interface devices (150). The network interface device(s) (150) enable communication over a network to another computing entity (e.g., server, other gaming console). The network interface device(s) (150) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (150) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The storage (160) may be removable or non-removable, and includes magnetic disks, magnetic tapes or cassettes, optical disk media and/or any other media which can be used to store information and which can be accessed within the gaming console (100). The storage (160) stores instructions for the software (130) implementing one or more innovations for positioning and/or compositing a camera video overlay on gameplay video.

A camera input (170) accepts video input in analog or digital form from a video camera, which captures natural video. In particular, the camera input (170) can provide frames of a camera video overlay to be composited on gameplay video. The frames of the camera video overlay can be received in the appropriate size for compositing. Or, the frames of the camera video overlay can be down-sampled after they are received by the gaming console (100). An audio input (not shown) accepts audio input in analog or digital form from a microphone, which captures audio.

The gaming console optionally includes a motion sensor/tracker input (172) for a motion sensor/tracker, which can track the movements of a user and objects around the user. For example, the motion sensor/tracker allows a user (e.g., player of the game) to interact with the gaming console (100) through a natural user interface using gestures and spoken commands. The motion sensor/tracker can incorporate gesture recognition, facial recognition and voice recognition.

A game controller input (180) accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

A video output (190) provides video output to a display device. The video output (190) can be an HDMI output or other type of output. When the video output (190) conveys gameplay to the display device, a screen capture module (not shown) can capture frames of the gameplay as gameplay video. Alternatively, the frames of gameplay video are captured in some other way. An audio output (not shown) provides audio output to one or more speakers.

The gaming console (100) includes a video encoder (112) that can encode gameplay video and/or camera video. For example, the video encoder (112) is provided with special-purpose video encoding hardware as part of a SoC with the processing unit(s) (110). Alternatively, the video encoder is implemented as a software encoder that runs on one of the processing unit(s) (110). Or, the video encoder can be implemented using hardware acceleration with graphics hardware of the gaming console (100). The video encoder (112) can produce video formatted according to the H.264/AVC standard or formatted according to another standard or format (e.g., H.265/HEVC, VPx, SMPTE 421M or another format).

The gaming console (100) can also include an audio encoder (not shown) that encodes audio associated with the gameplay video and/or camera video. The audio encoder can produce encoded audio data in AAC format, HE-AAC format, a Windows Media Audio format, MP3 format, or another format. The gaming console (100) can also include a video decoder (not shown) and audio decoder (not shown).

The gaming console (100) may have additional features. For example, the gaming console (100) includes one or more other input devices and/or one or more other output devices. The other input device(s) may be a touch input device such as a keyboard, mouse, pen, or trackball, a scanning device, or another device that provides input to the gaming console (100). The other output device(s) may be a printer, CD-writer, or another device that provides output from the gaming console (100).

An interconnection mechanism (not shown) such as a bus, controller, or network interconnects the components of the gaming console (100). Typically, operating system software (not shown) provides an operating environment for other software executing in the gaming console (100), and coordinates activities of the components of the gaming console (100).

One or more "companion" devices (not shown) can be associated with the gaming console (100). A companion device runs a companion application that facilitates interaction with the gaming console (100). A companion device is typically a smartphone or tablet, but can instead be a computing device with some other form factor. The companion application can allow the companion device to serve as an additional screen and/or controller for media content or gameplay. Or, the companion application can allow the companion device to serve as a media source or messaging tool for the gaming console (100).

The innovations can be described in the general context of computer-readable media. Computer-readable media are any available tangible media that can be accessed within a computing environment. By way of example, and not limitation, with the gaming console (100), computer-readable media include memory (120), storage (160), and combinations thereof.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or hardware with software implementing the functionality described herein.

For the sake of presentation, the detailed description uses terms like "determine," "receive" and "provide" to describe computer operations in a computing system. These terms are high-level abstractions for operations performed by a computer, and should not be confused with acts performed by a human being. The actual computer operations corresponding to these terms vary depending on implementation.

II. Example Architectures

Figure 2:
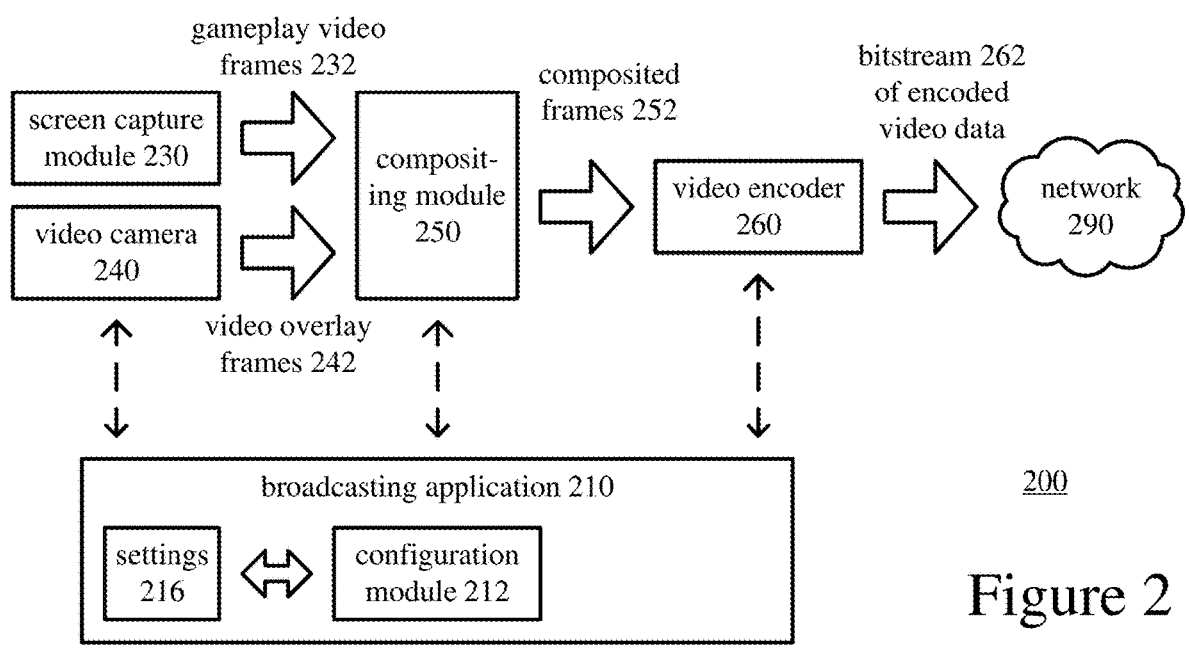
FIG. 2 is a diagram of an example architecture for compositing a camera video overlay on gameplay video for broadcasting.

FIG. 2 shows an example architecture (200) for compositing a camera video overlay on gameplay video for broadcasting. The architecture (200) includes a broadcasting application (210), a screen capture module (230), a video camera (240), a compositing module (250), a video encoder (260) and a network (290).

The broadcasting application (210) is adapted to control gameplay broadcasting. In particular, the broadcasting application (210) requests or controls certain operations performed by the screen capture module (230), the video camera (240), the compositing module (250) and the video encoder (260). The broadcasting application (210) can request/control such operations on a frame-by-frame basis. In some example implementations, the gameplay broadcasting can be performed in real time or near real time with smooth frame rates such as 30 frames per second.

The screen capture module (230) is adapted to capture frames of gameplay video that represents the gameplay rendered for display. The broadcasting application (210) requests and receives one of the gameplay video frames (232) recorded by the screen capture module (230). The screen capture module (230) can be part of the platform for a gaming console. The screen capture module (230) can record frames, for example, by reading pixel values from a display buffer after gameplay animations, graphics, etc. have been rendered to the display buffer by a rendering engine. Or, the screen capture module (230) can record frames of the gameplay video in some other way.

The video camera (240) captures frames of natural video. The broadcasting application (210) requests and receives one of the video overlay frames (242) recorded by the video camera (240).

If the video overlay frames (242) do not have the appropriate resolution for compositing, a scaler (not shown) resizes the video overlay frames (242). For example, the scaler scales a 1080p camera video frame to a smaller resolution such as 360×240 or 240×180. In some example implementations, video overlay frames (242) always have the same spatial resolution before they are composited onto gameplay video frames (232). Alternatively, the broadcasting application (210) can adjust (or request that the video camera (240) adjust) the spatial resolution of the video overlay frames (242).

The broadcasting application (210) instructs the compositing module (250) to composite the received frame of camera video overlay on the received frame of gameplay video. The compositing module (250) can be part of the platform for a gaming console, e.g., in a rendering engine. Alternatively, the broadcasting application (210) can include the compositing module. For the compositing operation, the compositing module (250) replaces certain pixel values of the frame of the gameplay video with pixel values of the frame of the camera video overlay. The compositing module (250) can overwrite the to-be-replaced pixel values of the frame of the gameplay video. In this way, the compositing module (250) produces composited frames (252).

The composited frames (252) are provided to the video encoder (260), which is instructed by the broadcasting application (210) to encode the composited frames (252). The video encoder (260) encodes the composited frames (252) and produces a bitstream of encoded video data (262). In some example implementations, the video encoder (260) is a hardware encoder provided as part of the platform for a gaming console. Alternatively, the video encoder (260) is a software video encoder or hardware-accelerated video encoder. The video encoder (260) can produce encoded video data (262) in H.264/AVC format or some other format (e.g., H.265/HEVC, VPx, SMPTE 421M).

As part of the encoding, the video encoder (260) can use intra-frame compression to remove redundancy within a given one of the composited frames (252). For example, the video encoder (260) uses spatial prediction, frequency transforms and quantization for spatial prediction residuals, and entropy coding of quantized transform coefficients and side information such as spatial prediction directions, mode decisions, etc. As part of the encoding, the video encoder (260) can also use inter-frame compression to exploit redundancy between frames of the composited frames (252). For example, the video encoder (260) uses motion compensation, frequency transforms and quantization for motion-compensated prediction residuals, and entropy coding of quantized transform coefficients and side information such as motion vector values, mode decisions, etc. In some example implementations, the video encoder (260) can partition a composited frame into regions (e.g., associated with different slices) in order to separate the encoding for the camera video overlay from the encoding for the gameplay video. In addition to improving coding performance (e.g., by disabling prediction across slice boundaries), this can simplify the process of allocating different levels of quality to the camera video overlay relative to the gameplay video. For example, the encoder can assign higher quality to the camera video overlay relative to the gameplay video. Or, the encoder can assign lower quality to the camera video overlay relative to the gameplay video.

The encoded video data (262) is provided to a buffer, where it is stored for transmission over a network connection across the network (290). For example, the encoded video data (262), after transport-level packetization, forward error correction, etc. is transmitted to a server for storage and/or broadcasting to one or more viewers. The server can be associated with a Web site for general video streaming, or the server can be associated with a specialized Web site for streaming of gameplay video.

Locally, the camera video overlay is not rendered to the display device (except perhaps as part of a preview, as described below). Thus, the camera video overlay does not obstruct the gameplay area seen by the player of the game. The camera video overlay is only added to the gameplay video that is broadcast (and, in some cases for some implementations, shown in the preview, as described below). Alternatively, the camera video overlay can be composited over the gameplay that is locally rendered.

The broadcasting application (210) can also control configuration of various aspects of gameplay broadcasting. For example, a configuration module (212) of the broadcasting application (210) causes the gaming console to render for display a configuration menu. The configuration menu shows options for placement of the camera video overlay on the gameplay video. The configuration module (212) of the broadcasting application (210) receives user input that specifies the placement of the camera video overlay on the gameplay video. The user input can be received from the gaming console, which receives it, for example, from the user through a game controller input or other input. The broadcasting application (210) stores an indication of the specified placement in settings (216) for gameplay broadcasting. The settings (216) can be stored locally (e.g., in the gaming console). Or, the settings can be stored in cloud-based storage for the user. The settings (216) can be specific to a user profile for the user, specific to a game under the user profile, or generally applicable for the gaming console.

In the example of FIG. 2, the broadcasting application (210) of a gaming console controls configuration of settings for gameplay broadcasting. Alternatively, a companion device associated with the gaming console can perform operations for rendering the configuration menu, receiving user input that specifies placement of the camera video overlay, and/or storing the indication of the specified placement.

The configuration menu can also show options and controls for other settings for gameplay broadcasting. For example, the configuration menu shows (a) a preview of the camera video overlay composited on the gameplay video at the specified placement, (b) an option for enabling or disabling input from a video camera for the camera video overlay, (c) an option for enabling or disabling input from a microphone, (d) options for re-sizing the camera video overlay, (e) options for including a chat stream, and/or (f) another option or control. The configuration menu can include one or more text entry areas for the user to specify a title, player, author, date, comments, etc. for the gameplay broadcasting. The configuration menu can even include encoding options for the gameplay broadcasting, such as spatial resolution for composited frames, temporal resolution (that is, frame rate) and/or quality level (expressed in terms of bitrate or classification such as low/medium/high).

III. Example Configuration Menus

Different video games have different graphical features such as score, map, inventory, timer, message stream, health indicator, roster of players or characters, and so on. Depending on the game, or even depending on the stage of the game, the parts of a screen that show the most important information can be different. When a camera video overlay is always positioned at the same location, it may cover or obscure important information for the game. In some example implementations, a gaming console (or companion device) permits a user (e.g., player of a game) to specify the position at which a camera video overlay is composited on gameplay video. Thus, the user can select the position that the user considers best for the camera video overlay that is composited on gameplay video for broadcasting. This can improve the quality of the gameplay video that is broadcast. The gaming console (or companion device) can also permit the user to control other aspects of the configuration of gameplay broadcasting.

Figure 3:
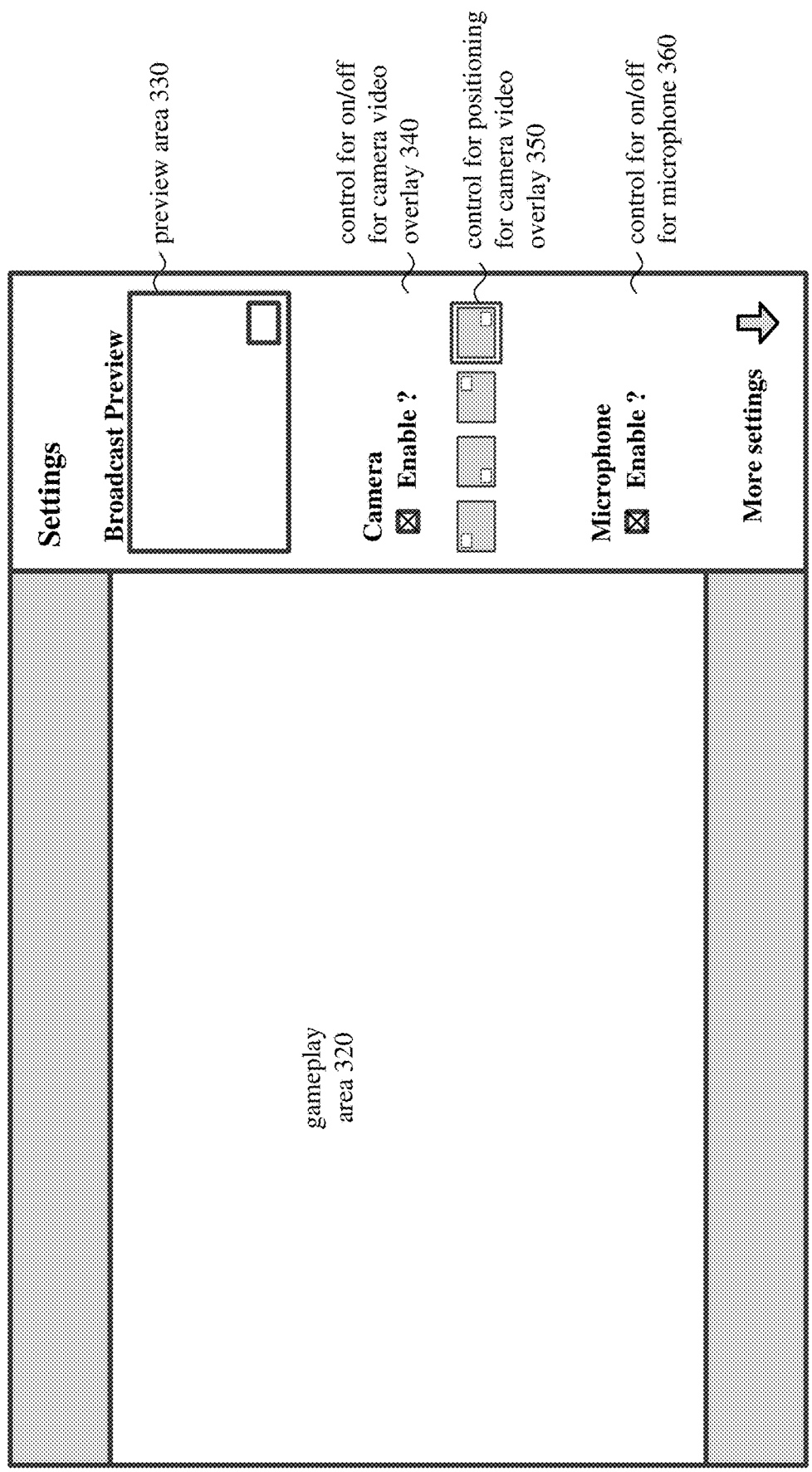
FIG. 3 is a diagram illustrating an example configuration menu for specifying placement of a camera video overlay on gameplay video for broadcasting.

FIG. 3 shows an example screen (300) with a configuration menu for specifying placement (that is, position) of a camera video overlay on gameplay video for broadcasting. In the screen (300), the gameplay area (320) is scaled down to make room for the configuration menu. Black or gray bars can be added above and below the gameplay area (320) so that its aspect ratio is unchanged. Although FIG. 3 shows the configuration menu as a graphical bar "snapped" to the right of the screen (300), the configuration menu can instead be a graphical bar snapped to the left side, top or bottom of the screen (300), with appropriate scaling of the gameplay area (320). Alternatively, the configuration menu can be rendered over the gameplay area without scaling of the gameplay area. In any case, after the configuration menu is closed, the gameplay area (320) is rendered normally again (e.g., rendered full screen). The user can switch between full-screen gameplay mode and the configuration menu mode shown in FIG. 3, for example, using a button on a game controller.

The configuration menu shows settings for gameplay broadcasting. The settings include a control (340) for on/off of the camera video overlay. When the camera is enabled (camera video overlay is on), the settings include a control (350) for position of the camera video overlay on gameplay video for broadcasting. For example, in FIG. 3, the control (350) presents four options for placement of the camera video overlay. The four options are the four corners of the gameplay video. The user (e.g., player of the game) can pick the placement of the camera video overlay and thereby customize the gameplay video that is broadcast. When used in conjunction with the architecture (200) shown in FIG. 2, the user-specified placement of camera video overlay can be applied during compositing operations at the platform level.

The configuration menu also includes a preview area (330). In the preview area (330), a still frame of the gameplay video (or a series of frames of the gameplay video) is shown with the camera video overlay composited at the specified location. This can give the user a sense of how the gameplay broadcast will be viewed by others, without obscuring the gameplay area (320) itself or obscuring the gameplay area in full-screen mode.

The configuration menu can include other and/or additional settings. For example, in FIG. 3, the configuration menu includes a control (360) for on/off of a microphone for the gameplay broadcasting. Or, the configuration menu can include one or more text entry areas for the user to specify a title, player, author, date, comments, etc. for the gameplay broadcasting. When the spatial resolution of the camera video overlay is adjustable, the configuration menu can allow the user to specify a spatial resolution of the camera video overlay. The configuration menu can even include encoding options for the camera video overlay and/or gameplay video, such as spatial resolution, temporal resolution and/or quality level.

The configuration menu can remain open during gameplay. In this case, the configuration menu can include a chat stream with comments, suggestions, requests, etc. from viewers of the gameplay broadcast. Viewers can also verbally respond to the gameplay broadcast, with the audio responses conveyed back to the gaming console of the player and rendered. Also, whether the configuration menu remains open during gameplay or is closed then reopened during gameplay, the user can change the placement of the camera video overlay on the gameplay video during broadcasting.

IV. Example Techniques for Adjusting Placement of a Camera Video Overlay

Figure 4:
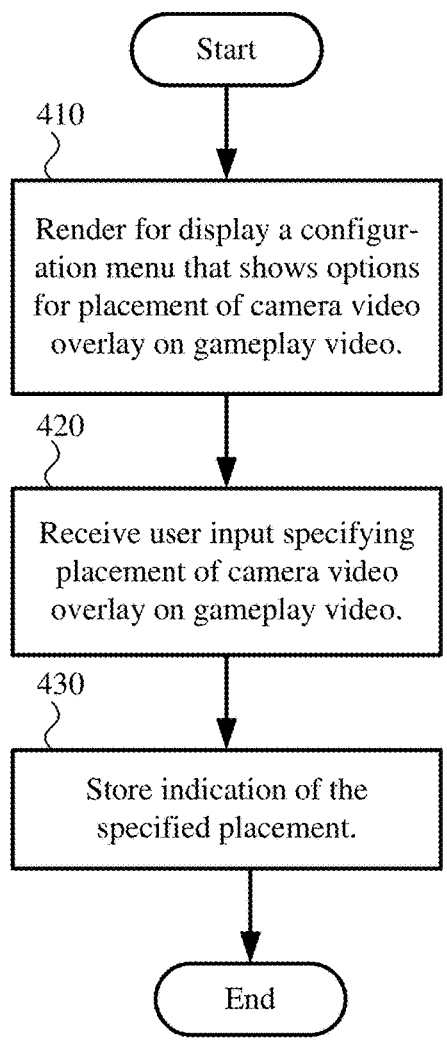
FIG. 4 is a flowchart illustrating a generalized technique for specifying placement of a camera video overlay on gameplay video for broadcasting.

FIG. 4 shows a generalized technique (400) for specifying placement (that is, position) of a camera video overlay on gameplay video for broadcasting. The technique (400) can be performed by a gaming console as described with reference to FIG. 1 (or, more specifically, by a broadcasting application or configuration module as described with reference to FIG. 2). Or, the technique (400) can be performed by a companion device associated with the gaming console (that is, a device running a companion application that facilitates interaction with the gaming console), or by the gaming console and companion device working in tandem.

The gaming console or companion device renders (410) for display a configuration menu. The configuration menu shows options for placement of a camera video overlay on gameplay video, which represents gameplay rendered for display. For example, the configuration menu is part of a graphical bar that is snapped to the side of a gameplay area, as described with reference to FIG. 3. The gameplay area can be scaled to a smaller size to make room for the configuration menu, or the configuration menu can be superimposed on the gameplay area. Alternatively, the configuration menu is rendered for display in some other way (e.g., in a screen that replaces the gameplay area, or on another device such as a tablet or smartphone as a companion device).

The options for the placement of the camera video overlay can include four corner locations on the gameplay video. Or, the options for the placement of the camera video overlay can include other and/or additional locations on the gameplay video (e.g., middles of sides, free positioning at arbitrary x, y coordinates on the gameplay video). The configuration menu can present other and/or additional information for options, controls, settings, etc., as described above with reference to FIG. 3.

The gaming console or companion device receives (420) user input specifying the placement of the camera video overlay on the gameplay video. For example, the user input can specify one of the four corner locations on the gameplay video, or otherwise specify an option for a location of the camera video overlay on the gameplay video for broadcasting.

The gaming console or companion device stores (430) an indication of the specified placement. For example, the gaming console stores the indication of the specified placement in settings for a broadcasting application. The settings for the broadcasting application can be stored locally (e.g., in the gaming console) and/or in cloud-based storage for the user. The settings can be specific to a user profile for the user, specific to a game under the user profile, or generally applicable for the gaming console. Subsequently, during gameplay, the gaming console can render gameplay for display. For gameplay broadcasting, the gaming console captures the gameplay as frames of the gameplay video. The gaming console composites frames of the camera video overlay on respective frames of the gameplay video at the specified placement. The frames of the camera video overlay are not composited on the gameplay that is rendered for display, however. Thus, local gameplay is not obscured by the camera video overlay.

A specified placement of camera video overlay on gameplay video can be used throughout an entire gameplay broadcast. Alternatively, the placement of the camera video overlay on the gameplay video can be changed during broadcasting. For example, during broadcasting, the gaming console or companion device renders (410) the configuration menu again, receives (420) new user input specifying the placement of the camera video overlay on the gameplay video, and stores (430) an indication of the newly specified placement, which can be used when compositing the camera video overlay on the gameplay video for broadcasting. In this way, during broadcasting, the user can change which portion of the gameplay video is obscured by the camera video overlay, depending on the stage of the gameplay or some other factor.

V. Example Techniques for Compositing a Camera Video Overlay on Gameplay Video

Figure 5:
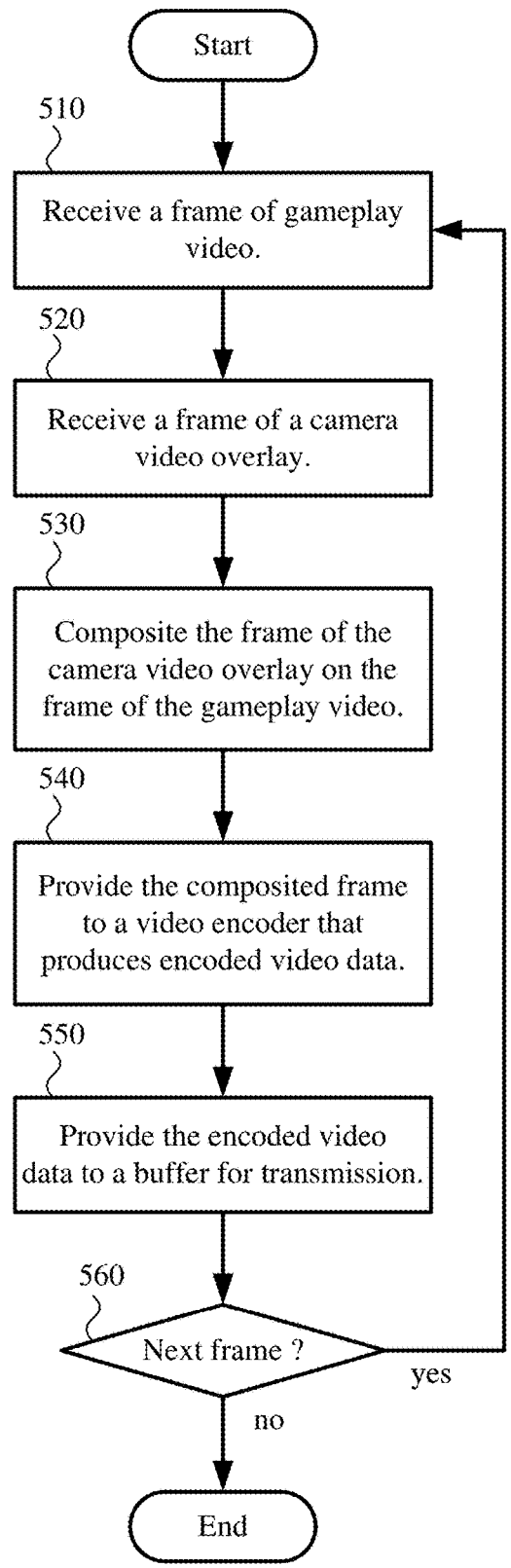
FIG. 5 is a flowchart illustrating a generalized technique for compositing a camera video overlay on gameplay video for broadcasting.

FIG. 5 shows a generalized technique (500) for compositing a camera video overlay on gameplay video for broadcasting. The technique (500) can be performed by a gaming console as described with reference to FIG. 1.

The gaming console receives (510) a frame of gameplay video, which represents gameplay rendered for display. For example, the frame of the gameplay video is received from a screen capture module that captures the gameplay rendered for display.

The gaming console also receives (520) a frame of a camera video overlay. For example, the frame of camera video overlay is received from a video camera that captures natural video. The gaming console can re-size the camera video overlay, if appropriate. For example, the gaming console can down-sample or otherwise scale down frames of the camera video overlay to a size appropriate for a picture-in-picture window in the gameplay video.

The gaming console composites (530) the frame of the camera video overlay on the frame of the gameplay video to produce a composited frame. For example, the gaming console replaces certain pixel values of the gameplay video frame with pixel values of the frame of the camera video overlay.

The gaming console provides (540) the composited frame to a video encoder that produces encoded video data. Finally, the gaming console provides (550) the encoded video data to a buffer for transmission. The encoded video data can be streamed over a network to a server for storage and/or broadcasting to one or more viewers. Or, the encoded video data can be streamed over a network to another gaming console or a viewing device (such as a companion device for the other gaming console or the originating gaming console) for storage and/or playback.

The gaming console checks (560) whether to continue with a next frame. If so, the gaming console receives (510) another gameplay video frame and receives (520) another frame of the camera video overlay. Thus, the gaming console can repeat some operations or all operations of the technique (500) on a frame-by-frame basis. At the same time, locally, the gaming console renders gameplay for display without compositing the camera video overlay on the gameplay. Thus, the gameplay seen by the player is not obstructed by the camera video overlay.

VI. Alternatives and Variations

In many of the preceding examples, frames of camera overlay video are composited on frames of gameplay video to produce composited frames, and the composited frames are encoded and streamed. Alternatively, a gaming console encodes frames of camera overlay video for a first bitstream of encoded video data, encodes frames of gameplay video for a second bitstream of encoded video data, and streams the two bitstreams to a server or other gaming console (or viewing device). In this case, a server-side application or viewer-side application can composite the frames of camera overlay video on the gameplay video. Or, the frames of camera video can be displayed on a tablet computer or smartphone (e.g., as a companion device) while the gameplay video is rendered on a display device through a gaming console.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. In a gaming console, a method comprising:
retrieving a stored indication of a specified placement position for a camera video overlay on gameplay video;
receiving a frame of the gameplay video that represents gameplay rendered for display;
receiving a frame of the camera video overlay;
compositing the frame of the camera video overlay on the frame of the gameplay video at the specified placement position to produce a composited frame;
providing the composited frame to a video encoder that produces encoded video data;
providing the encoded video data to a buffer for display or transmission, and:
(1) rendering the encoded video for display and displaying the rendered encoded video; or
(2) transmitting the encoded video data to be decoded and displayed by a remote computing device.
2. The method of claim 1, wherein the encoded video data is provided to the buffer for transmission comprising streaming over a network to a server for storage and/or broadcasting to one or more viewers.
3. The method of claim 1, wherein the encoded video data is provided to the buffer for transmission comprising streaming over a network to another gaming console or a viewing device for storage and/or playback.

4. The method of claim 1, further comprising:
rendering for display a configuration menu that shows a plurality of options for placement of the camera video overlay on the gameplay video;
receiving user input specifying the placement of the camera video overlay on the gameplay video; and
storing an indication of the specified placement.

5. The method of claim 4, wherein the configuration menu is presented using one or more screens, wherein at least one of the one or more screens also shows at least one member of the group consisting of:
a preview of the camera video overlay composited on the gameplay video at the specified placement;
an option for enabling or disabling input from a video camera for the camera video overlay;
an option for enabling or disabling input from a microphone;
options for re-sizing the camera video overlay; and
options for including a chat stream.

6. The method of claim 4, wherein the configuration menu also shows:
a preview of the camera video overlay composited on the gameplay video at the specified placement; and
options for re-sizing the camera video overlay.

7. The method of claim 6, wherein the at least one option for the placement of the camera video overlay includes at least one of four corner locations on the gameplay video.

8. The method of claim 6, wherein the at least one option for the placement of the camera video overlay includes at least one corner location on the gameplay video.

9. The method of claim 1, further comprising:
presenting a user with one or more configuration screens associated with broadcasting gameplay video, wherein one or more of the plurality of configuration menus show:
a preview of the camera video overlay composited on the gameplay video at the specified placement;
an option for enabling or disabling input from a video camera for the camera video overlay;
an option for enabling or disabling input from a microphone;
options for re-sizing the camera video overlay;
options for including a chat stream;
options for selecting a broadcast video quality; and
on option to input a title associated with a broadcasted gameplay video.

10. The method of claim 9, wherein the one or more configuration screens show a plurality of options for the placement of the camera video overlay on the gameplay video.

11. The method of claim 1, further comprising:
capturing frames of gameplay video that represents gameplay rendered for display.

12. The method of claim 1, wherein providing the encoded video data to a buffer for display or transmission comprises rendering the encoded video for display and displaying the rendered encoded video.

13. The method of claim 1, wherein providing the encoded video data to a buffer for display or transmission comprises transmitting the encoded video data to be decoded and displayed by a remote computing device.

14. The method of claim 1, further comprising:
rendering the gameplay for display without compositing the camera video overlay on the gameplay that is rendered for display.

15. One or more tangible computer-readable media storing computer-executable instructions for causing a computing system programmed thereby to perform a method, wherein the computing system includes one or more of a gaming console and a companion device associated with the gaming console, the method comprising:
retrieving a stored indication of a specified placement position for a camera video overlay on gameplay video;
receiving a frame of the gameplay video that represents gameplay rendered for display;
receiving a frame of the camera video overlay;
compositing the frame of the camera video overlay on the frame of the gameplay video at the specified placement position to produce a composited frame;
providing the composited frame to a video encoder that produces encoded video data;
providing the encoded video data to a buffer for display or transmission, and:
(1) rendering the encoded video for display and displaying the rendered encoded video; or
(2) transmitting the encoded video data to be decoded and displayed by a remote computing device.

16. The one or more tangible computer-readable media of claim 15, further comprising:
rendering for display a configuration menu that shows a plurality of options for placement of the camera video overlay on the gameplay video;
receiving user input specifying the placement of the camera video overlay on the gameplay video; and
storing an indication of the specified placement.

17. The one or more tangible computer-readable media of claim 16, wherein the configuration menu is presented using one or more screens, wherein at least one of the one or more screens also shows at least one member of the group consisting of:
a preview of the camera video overlay composited on the gameplay video at the specified placement;
an option for enabling or disabling input from a video camera for the camera video overlay;
an option for enabling or disabling input from a microphone;
options for re-sizing the camera video overlay; and
options for including a chat stream.

18. The one or more tangible computer-readable media of claim 16, wherein the configuration menu also shows:
a preview of the camera video overlay composited on the gameplay video at the specified placement; and
options for re-sizing the camera video overlay.

19. A gaming console comprising at least one processor and at least one memory in communication with the at least one processor, the at least one memory comprising computer-executable instructions for performing operations comprising:
retrieving a stored indication of a specified placement position for a camera video overlay on gameplay video;
receiving a frame of the gameplay video that represents gameplay rendered for display;
receiving a frame of the camera video overlay;
compositing the frame of the camera video overlay on the frame of the gameplay video at the specified placement position to produce a composited frame;
providing the composited frame to a video encoder that produces encoded video data;
providing the encoded video data to a buffer for display or transmission, and:
(1) rendering the encoded video for display and displaying the rendered encoded video; or
(2) transmitting the encoded video data to be decoded and displayed by a remote computing device.

20. The gaming console of claim 19, further comprising:
rendering for display a configuration menu that shows:
- a plurality of options for placement of the camera video overlay on the gameplay video;
- a preview of the camera video overlay composited on the gameplay video at the specified placement;
- an option for enabling or disabling input from a video camera for the camera video overlay;
- an option for enabling or disabling input from a microphone;
- options for re-sizing the camera video overlay; and
- options for including a chat stream;

receiving user input specifying the placement of the camera video overlay on the gameplay video; and
storing an indication of the specified placement.

* * * * *